Figure 1:
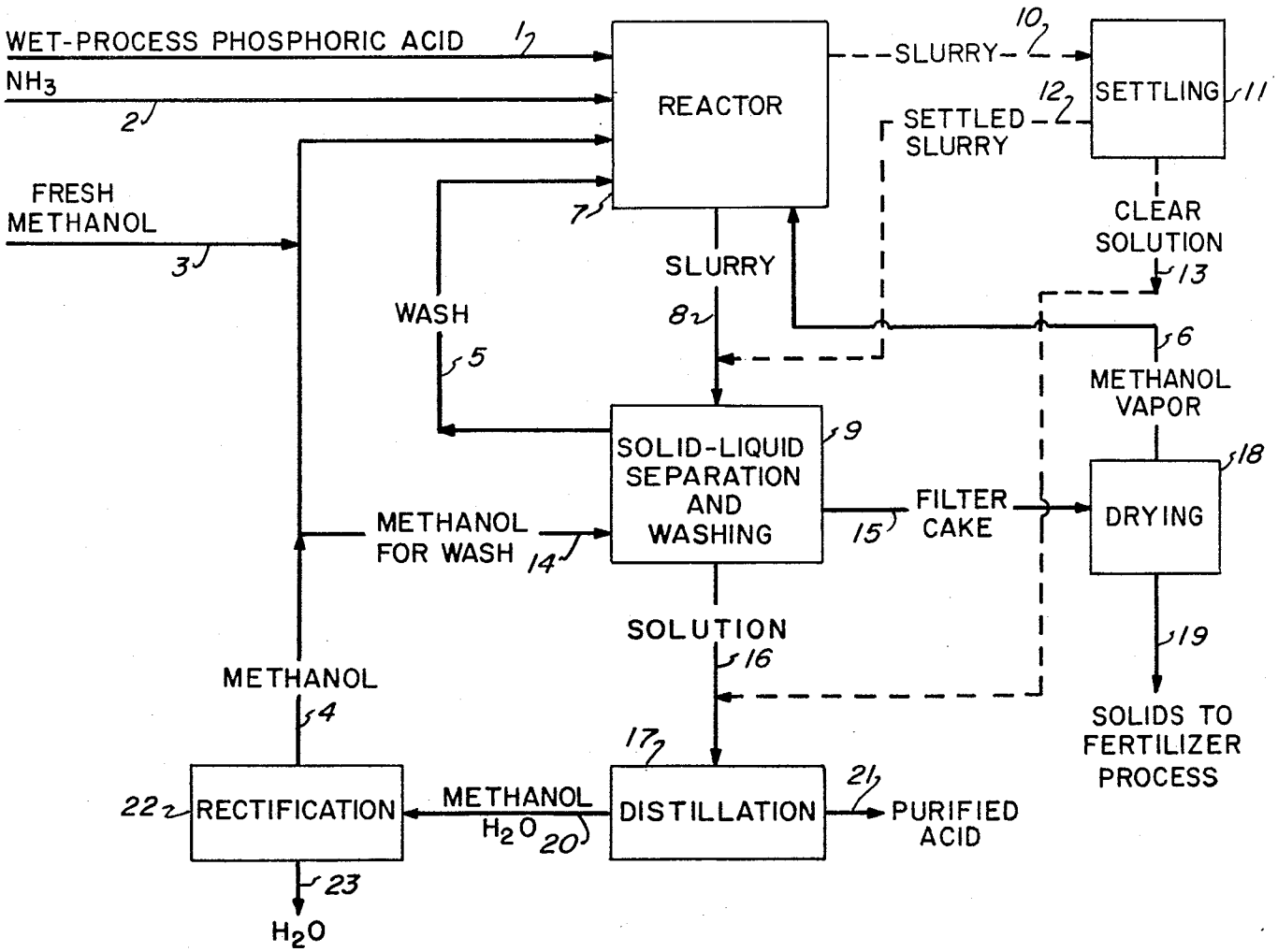
Figure 2:
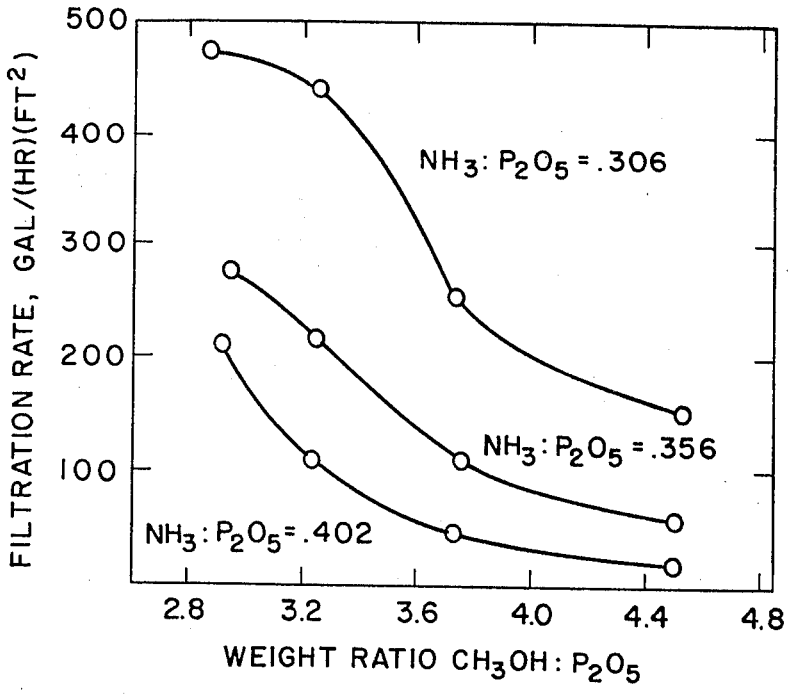
Figure 3:
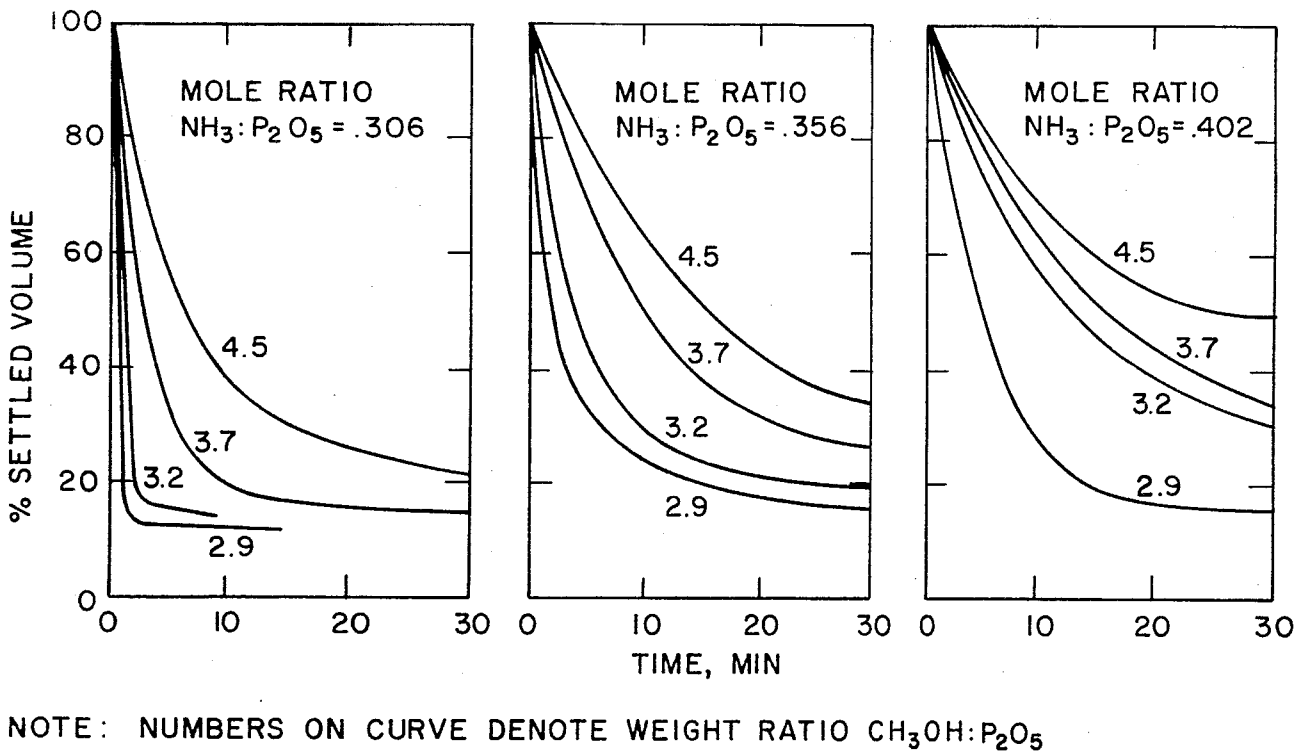

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 9

T932,002

PURIFICATION OF WET-PROCESS PHOSPHORIC ACID WITH METHANOL AND AMMONIA

John F. McCullough, 2909 Alexander, and Leland L. Frederick, Rte. 5, Box 303-B, both of Florence, Ala. 35630

Filed Oct. 12, 1973, Ser. No. 406,103
Int. Cl. C01b *25/16*
U.S. Cl. 423—321
3 Sheets Drawing. 35 Pages Specification

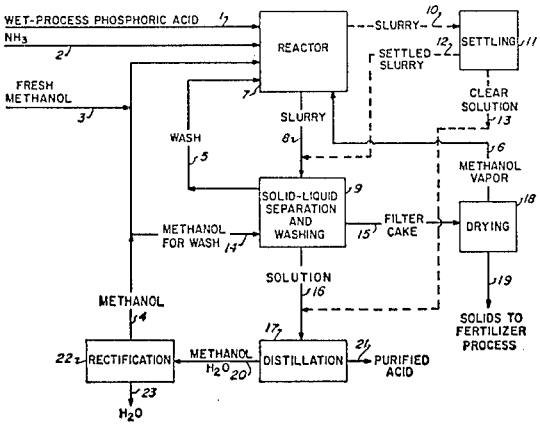

Improved process for partial purification of merchant-grade wet-process phosphoric acid with co-production of impure phosphoric acid or solid fertilizer materials containing from 50 to 95 percent of the impurities originally present in the crude acid. Crude acid is treated with from 2.5 to 4.2 pounds of methanol per pound of $P_2O_5$ and with from 0.26 to 0.4 equivalents of a soluble ammonium compound per mole of $P_2O_5$ to precipitate most of the metallic and fluorine impurities and 7 to 14 percent of the $P_2O_5$ as solid ammonium metallic phosphates and fluoride compounds. The reaction mixture is maintained at temperatures from 35° C. to its boiling point (about 70° C.) for 15 to 90 minutes to form slurries that filter and settle rapidly. The solids are separated from the reaction mixture and methanol is distilled from the resulting clarified solution to form concentrated partially purified acid. The solid ammonium metallic phosphates contain from 44 to 54 percent $P_2O_5$, all of which is available and about 50 percent is water soluble by AOAC procedures. Alternately, the reaction slurry is separated into a clarified liquid fraction and a settled slurry fraction. Methanol is distilled from the settled fraction, which causes most of the impurities to redissolve, yielding impure phosphoric acid.

NOTE: NUMBERS ON CURVE DENOTE WEIGHT RATIO $CH_3OH : P_2O_5$